(12) United States Patent
Maniam et al.

(10) Patent No.: US 7,570,246 B2
(45) Date of Patent: Aug. 4, 2009

(54) METHOD AND APPARATUS FOR COMMUNICATION USING PULSE-WIDTH-MODULATED VISIBLE LIGHT

(75) Inventors: Selvan Maniam, Penang (MY); Eit Thian Yap, Penang (MY); Kean Loo Keh, Penang (MY)

(73) Assignee: Avago Technologies ECBU IP (Singapore) Pte. Ltd. (SG)

( * ) Notice: Subject to any disclaimer, the term of this patent is extended or adjusted under 35 U.S.C. 154(b) by 661 days.

(21) Appl. No.: 11/194,956

(22) Filed: Aug. 1, 2005

(65) Prior Publication Data
US 2007/0024571 A1  Feb. 1, 2007

(51) Int. Cl.
*G09G 3/36* (2006.01)
*G09G 5/00* (2006.01)
*H04B 10/04* (2006.01)

(52) U.S. Cl. .................. 345/102; 345/1.2; 345/207; 398/140; 398/183

(58) Field of Classification Search .............. 345/102, 345/207, 1.2; 398/183, 140
See application file for complete search history.

(56) References Cited

U.S. PATENT DOCUMENTS

| 5,535,147 A * | 7/1996 | Jacobs et al. ............ 708/111 |
| 5,652,602 A * | 7/1997 | Fishman et al. ........... 345/156 |
| 5,815,127 A * | 9/1998 | Jacobs et al. ............ 345/1.2 |
| 6,621,482 B2* | 9/2003 | Fuller ................... 345/102 |
| 2002/0171639 A1* | 11/2002 | Ben-David ............... 345/207 |
| 2004/0125053 A1* | 7/2004 | Fujisawa ................ 345/76 |
| 2005/0265731 A1* | 12/2005 | Keum et al. ............. 398/183 |
| 2006/0056855 A1* | 3/2006 | Nakagawa et al. ........ 398/183 |
| 2006/0119541 A1* | 6/2006 | Blythe et al. ........... 345/31 |

* cited by examiner

*Primary Examiner*—Alexander Eisen
*Assistant Examiner*—Viet Pham

(57) ABSTRACT

A visible light communications transmitter combines a modulated carrier signal with a pulse from a pulse generator. The carrier signal is modulated according to data read from a buffer during the pulse.

19 Claims, 3 Drawing Sheets

METHOD AND APPARATUS FOR COMMUNICATION USING PULSE-WIDTH-MODULATED VISIBLE LIGHT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

Display panels, such as those used in personal computers, digital assistants, and mobile ("cell") telephones, often use a backlight in combination with a diffuser panel to illuminate a liquid-crystal display ("LCD") panel. The backlight provides white light that is controlled by the LCD panel to produce a color display. Cold-cathode fluorescent lamps ("CCFLs") are frequently as backlights in display panels.

A CCFL is typically a tube filled with gas or vapor and coated on the inside with phosphors. A current is passed through the tube, causing the gas or vapor to emit light that is converted to other wavelengths by the phosphors to produce white light. The CCFL is typically driven by a sinusoidal signal, and the brightness is regulated by controlling the current through the tube. It is generally desirable to maintain the CCFL in an ON condition during use.

Visible light communication ("VLC") is used to transmit data from one electronic device to another. Some systems use an auxiliary light-emitting diode ("LED") lamp controlled by a transmitting computer, such as notebook or laptop computer, to illuminate an optical receiver of a receiving computer. However, this is cumbersome and consumes additional power, which is often limited in a portable electronic device such as a notebook or laptop computer.

Therefore, VLC techniques that avoid the problems of the prior art are desirable.

BRIEF SUMMARY OF THE INVENTION

A visible light communications transmitter combines a modulated carrier signal with a pulse from a pulse generator. The carrier signal is modulated according to data read from a buffer during the pulse.

DETAILED DESCRIPTION OF THE EMBODIMENTS

LED backlights provide an alternative to CCFLs for use in display panels. LED backlights can provide a wider range of colors and freedom for the user to change or select the type white point of the backlight. LEDs in a display backlight are controlled to provide the desired color balance and brightness of the display.

The chief method of controlling the brightness of LED light sources, such as LED backlights, is by pulse width modulation ("PWM"). Basically, the LEDs in the light source are rapidly turned on and off. The human eye averages the bright ON state and dark OFF state of the light source to perceive a display having essentially constant brightness. Pulses are generated by a PWM generator that drives the LED light source. The length of time that the LED light source is turned ON is controlled by the width of the pulse(s). If the user wants a brighter display, an adjustment (user input) instructs the PWM generator to produce pulses of longer duration.

However, PWM of an LED light source means that the LEDs are switched off at certain times. This creates a challenge for using an LED light source in a VLC application. Since the LEDs in an LED light source are not always ON, they cannot send information in a continuous fashion. However, a non-continuous communication protocol, such as a packet-based protocol or a discontinuous serial protocol, can be used with LED light sources, such as an LED backlight in a display application to provide a VLC transmitter.

Figure 1A:
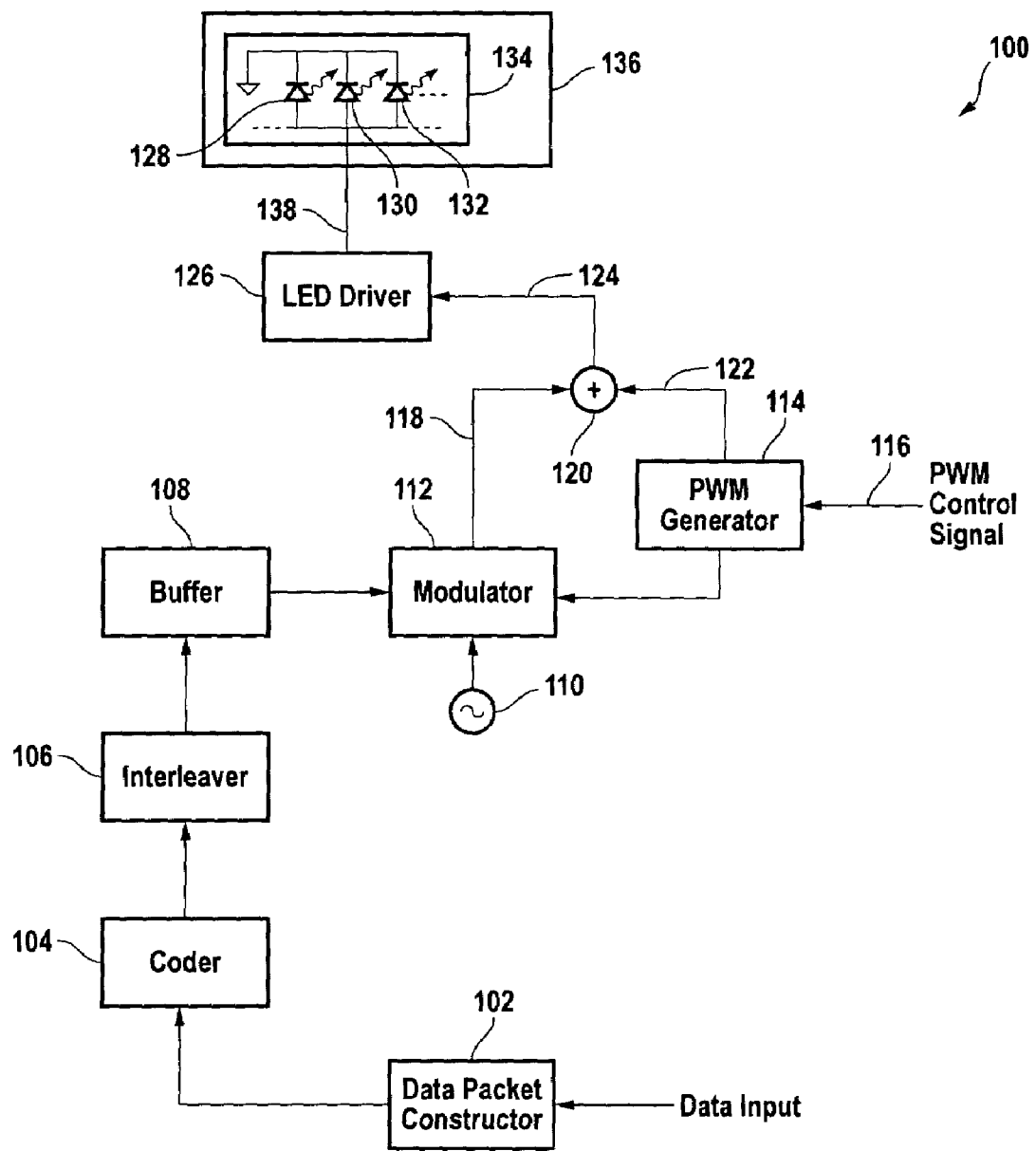
FIG. 1A is a diagram of a VLC transmitter according to an embodiment of the present invention.

FIG. 1A is a diagram of a VLC transmitter 100 according to an embodiment of the present invention. Data is input and organized into data packets in a data packet constructor 102. A coder 104 codes the packetized data using an appropriate coder scheme, such as Reed-Solomon coding and/or convolutional coding. In a particular embodiment, a Reed-Solomon coding scheme is used to provide forward error correction at a receiving device (see FIG. 2, ref. num. 208). Forward error correction basically adds redundancy to the transmitted information using a predetermined algorithm.

An optional interleaver 106 reorders the data bits in a predetermined sequence to provide a quasi-random pattern sequence of data bits, which, when transmitted, are substantially immune to periodic bursts of interference, such as flickering from ambient lighting or any sudden flashes or interruption of the transmission link that could momentarily disrupt the receiving process.

The packetized, coded, interleaved data ("coded data") is temporarily stored in a buffer 108, such as a first-in-first-out ("FIFO") buffer until read by a modulator 112. The coder and data packet constructor are omitted in alternative embodiments; however, are desirable in embodiments where forward error correction is employed. Alternatively, data is input directly to the buffer. Un-packetized data in the buffer are read by the modulator in a discontinuous fashion (i.e. during pulses) and are reassembled at the receiver. In yet other embodiments, packetizing, coding, and/or interleaving are done before the packetized/coded/interleaved data are sent to the VLC transmitter. Thus, a data packet constructor, a coder, and an interleaver are not necessary in such embodiments.

A signal generator 110 produces a carrier signal that is modulated by the modulator 112. In a particular embodiment, the modulator 112 modulates the frequency of the carrier signal. Alternatively, the amplitude of the carrier signal is modulated.

A PWM generator 114 generates a pulse train according to a PWM control signal 116 to adjust the brightness of a PWM LED light source 134. The PWM LED light source 134 is an LED backlight of a display 136 in an electronic device. For example, if a viewer wants a brighter display, the PWM control signal instructs the PWM generator 114 to provide pulses of longer duration. Alternatively, the PWM light source is separate from the backlight of a display in an electronic device, or provides LED-based ambient ("room") lighting, or other application where the brightness of an LED light source is controlled by pulse-width modulation.

The PWM generator is coupled to the modulator 112 so that the modulator reads coded data from the buffer 108 when the pulse is HIGH (i.e. when the LED backlight is ON). The modulator modulates the carrier signal according to the coded data read from the buffer 108. The modulated carrier signal 118 is added 120 to the pulse output 122 of the PWM generator 114.

The sum ("modulated pulse") 124 of the modulator output 118 and the PWM generator output 122 is coupled to an LED driver 126. The LED driver 126 essentially converts the modulated pulse to the proper current for driving the LEDs 128, 130, 132 in an LED backlight 134 of a display 136. Adding the modulated carrier to the pulse does not significantly affect the brightness of the display because the average brightness is essentially the same as if the display output were not modulated.

In a particular embodiment, the LEDs 128, 130, 132 are white-emitting LEDs and are controlled in unison by a single control line 138 to provide white light modulated by the coded data for use in a VLC system. Alternatively, the LEDs are colored LEDs, such as red-, green-, and blue-emitting LEDs whose outputs are combined to produce white light to illuminate the display panel.

Colored LEDs can be controlled in unison, to provide white light carrying coded data, or different colors can be separately controlled. In a particular embodiment, a VLC system has an optical receiver (see FIG. 1B, ref. num. 210) that is color-selective to receive the color of light that carries the coded data. For example, the LED backlight has red, green, and blue LEDs, and the blue LEDs are driven with the modulated pulses, while the green and red LEDs are driven with unmodulated pluses. In a further embodiment, a VLC system has multiple receivers that are selective for different colors, and the display transmits multiple channels (i.e. colors) of light having coded data. In a yet further embodiment, a VLC transmitter according to an embodiment selectively operates in a single-channel mode, either transmitting coded data as white light or as a selected color of light; or in a multi-channel mode, depending on the characteristics of the receiving device(s) in the VLC system.

Figure 1B:
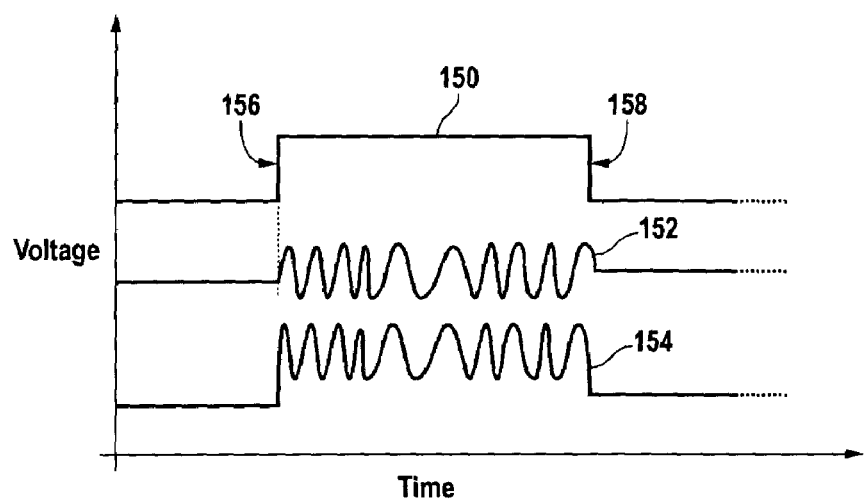
FIG. 1B shows a plot of a pulse-width-modulated carrier signal according to an embodiment of the present invention.

FIG. 1B shows a plot of a modulated pulse according to an embodiment of the present invention. A pulse 150 (see FIG. 1A, ref. num. 122) is added (see FIG. 1A, ref. num. 120) to a modulated carrier signal 152 (see FIG. 1A, ref. num. 118) to result in the modulated pulse 154. The ADD operation essentially adds a DC offset to the modulated carrier signal 152, but does not significantly change the total average brightness of the LED backlight during the pulse. The modulation occurs at sufficiently high frequencies so that a viewer does not notice objectionable flicker. More specifically, modulation occurs within a pulse, and the pulse repetition rate is usually sufficient to avoid objectionable flicker of the display.

In a particular embodiment, the modulator (see FIG. 1A, ref. num. 112) waits a selected period after the rising edge 156 of the pulse 150 to insure that the pulse is sufficiently high (and thus the display if ON) before coded data is read from the buffer (see FIG. 1A, ref. num. 108). In a further embodiment, the modulator stops reading data from the buffer before the trailing edge 158 of the pulse 150, which insures the coded data is transmitted before the LED backlight is turned OFF.

Figure 2:
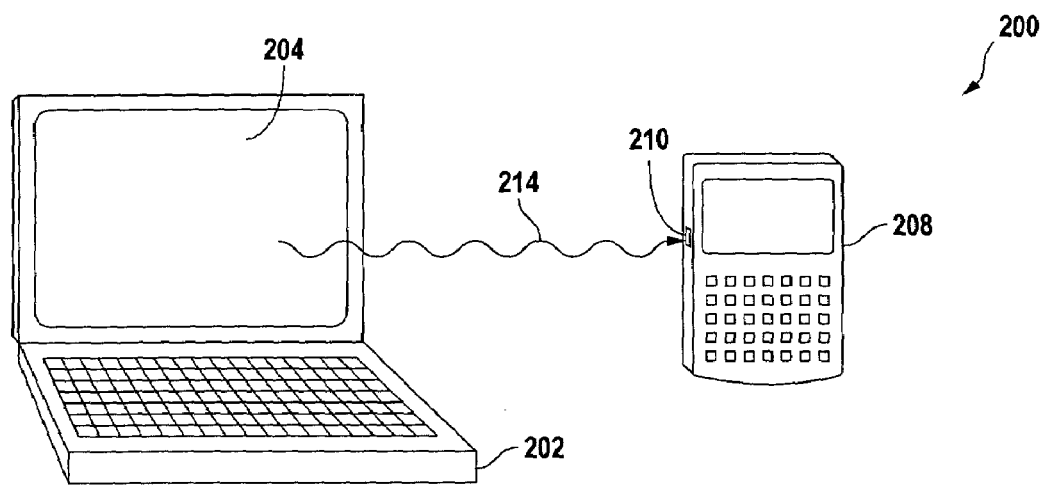
FIG. 2 shows a communication system according to an embodiment of the present invention.

FIG. 2 shows a communication system 200 according to an embodiment of the present invention. A first electronic device 202, such as a personal computer, notebook computer, laptop computer, personal digital assistant ("PDA") device, or mobile telephone has a display 204 with an LED backlight (see FIG. 1A, ref. num. 134) operated according to an embodiment of the invention. A second electronic device 208 has an optical receiver 210. In particular embodiments, the second electronic device 208 is a second personal computer, notebook computer, laptop computer, PDA device, mobile telephone, or simply a data input port of a digital system. The second electronic device 208 has a VLC receiver (not separately shown) that converts the modulated optical signal containing coded data 214 from the first digital device 202 back to data.

In a particular embodiment, the modulated optical signal containing coded data 214 is modulated white light. In an alternative embodiment, the backlight of the display 204 produces white light, and the modulated optical signal contains a first modulated color light signal. In a further embodiment, the optical receiver 210 is a color-selective optical receiver. In yet further embodiment, the modulated optical signal contains a second modulated color light signal.

Figure 3:
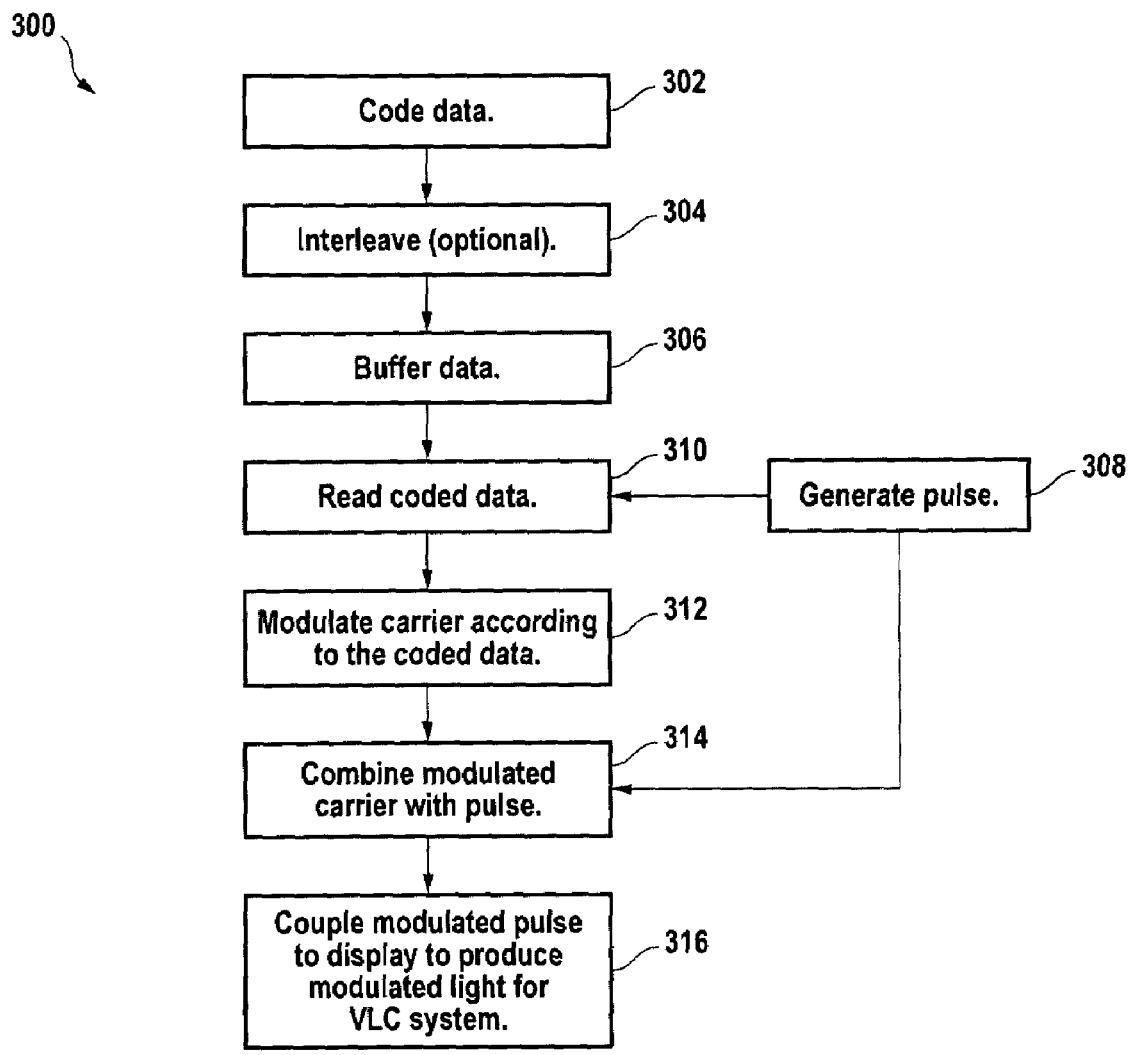
FIG. 3 is a flow chart of a method of communication using pulse-width-modulated visible light.

FIG. 3 is a flow chart of a method 300 of communication using pulse-width-modulated visible light. Data is coded (step 302) and optionally interleaved (304). The coded data is stored in a buffer (step 306). A pulse generator generates a pulse (step 308) that is coupled to a modulator. The modulator reads coded data from the buffer during the pulse (step 310) and modulates a carrier signal according to the coded data (step 312). The modulated carrier signal is combined to the pulse to create a modulated pulse (step 314). The modulated pulse is coupled to an LED backlight of a display so as to produce modulated light from the display for use in a VLC system (step 316).

While the preferred embodiments of the present invention have been illustrated in detail, it should be apparent that modifications and adaptations to these embodiments might occur to one skilled in the art without departing from the scope of the present invention as set forth in the following claims.

What is claimed is:

1. An electronic device comprising a display and a pulse-width-modulated ("PWM") light-emitting diode ("LED") backlight configured to adjust a brightness of the display, comprising:
    a data input configured to receive data therein;
    a buffer operably connected to the data input and configured to store data received from the data input;
    a pulse generator configured to generate a pulse;
    a signal generator configured to generate a carrier signal;
    a modulator operably coupled to the pulse generator, the buffer, and the signal generator, the modulator being configured to receive data from the buffer and modulate the carrier signal in accordance with the data received from the buffer to produce a modulated carrier signal;
    an adder configured to add the modulated carrier signal to the pulse to produce a modulated pulse; and
    an LED driver operably connected to the adder and configured to receive the modulated pulse therefrom, the LED driver further being operably connected to LEDs disposed within the PWM LED backlight and configured to drive the PWM LED backlight LEDs using the modulated pulse such that an average brightness of the display is essentially the same in respect of an unmodulated pulse being provided thereto;
    wherein the PWM LED backlight is configured to produce a modulated optical signal in accordance with the data that is suitable for use in a visible optical communications system.

2. The electronic device of claim 1, further comprising a data packet constructor and a coder disposed between the data input and the buffer.

3. The electronic device of claim 2, further comprising an interleaver disposed between the coder and the buffer.

4. The electronic device of claim 2, wherein the coder is configured to code packetized data using one of a Reed-Solomon coding scheme and a convolutional coding scheme.

5. The electronic device of claim 3, wherein the interleaver is configured to reorder data bits in a predetermined sequence.

6. The electronic device of claim 1, wherein the electronic device is a personal computer, a notebook computer, a laptop computer, a personal digital assistant, or a mobile telephone.

7. The electronic device of claim 4, wherein the PWM LED backlight comprises white light-emitting diodes.

8. The electronic device of claim 1, wherein the PWM LED backlight comprises colored LEDs.

9. The electronic device of claim 8, wherein outputs of the colored LEDs are combined to produce a white light.

10. The electronic device of claim 9, wherein each of the colored LEDs is operated according to the modulated pulse so as to produce modulated white light suitable for use in a visible optical communications system.

11. The electronic device of claim 9, wherein LEDs of a first color in the PWM LED light source are operated according to the modulated pulse so as to produce a first modulated colored light signal suitable for use in a visible optical communications system.

12. The electronic device of claim 11, wherein LEDs of a second color in the PWM LED light source are operated according to a second modulated pulse so as to produce a second modulated colored light signal suitable for use in the visible optical communications system.

13. A method of communication using pulse-width-modulated visible light, comprising:

storing data in a buffer;
generating a pulse;
reading data from the buffer during the pulse;
modulating a carrier signal according to the data to produce a modulated carrier signal;
combining the modulated carrier signal with the pulse to produce a modulated pulse; and
coupling the modulated pulse to a pulse-width-modulated ("PWM") light-emitting diode ("LED") backlight so as to produce light for backlighting and adjusting a brightness of a display in an electronic device and for use in a visible light communication system such that an average brightness of the display is essentially the same in respect of an unmodulated pulse being provided thereto and the PWM LED backlight produces a modulated optical signal in accordance with the data that is suitable for use in the visible optical communications system.

14. The method of claim 13, wherein modulating the carrier signal comprises frequency modulating the carrier signal.

15. The method of claim 13, wherein modulating the carrier signal comprises amplitude modulating the carrier signal.

16. The method of claim 15, wherein reading data includes waiting a selected period after a leading edge of the pulse before reading the data from the buffer.

17. The method of claim 16, wherein reading data further includes stopping reading the data from the buffer during a second selected period before a trailing edge of the pulse.

18. The method of claim 13, further comprising, prior to storing the data:
packetizing the data into data packets; and
coding the data packets so as to provide forward error correction.

19. The method of claim 18, further comprising, prior to storing the data, interleaving data.

* * * * *